United States Patent

[11] 3,630,787

[72] Inventor James W. Consolloy
  Pennington, N.J.
[21] Appl. No. 3,399
[22] Filed Jan. 16, 1970
[45] Patented Dec. 28, 1971
[73] Assignee ESB Incorporated

[54] BATTERY HAVING INTERNAL SEAT FOR CONFINING A MOVEABLE MEMBER
13 Claims, 10 Drawing Figs.

[52] U.S. Cl. .................................................... 136/177,
  136/178, 136/182
[51] Int. Cl. .................................................... H01m 1/06,
  H01m 7/00
[50] Field of Search ........................................... 136/177,
  178, 162, 163, 182

[56] References Cited
UNITED STATES PATENTS

| | | | |
|---|---|---|---|
| 1,276,593 | 8/1918 | Taube | 136/177 |
| 2,182,266 | 12/1939 | Schwartz | 136/178 |
| 2,375,406 | 5/1945 | Drown | 136/178 |
| 2,532,520 | 12/1950 | Simpson | 136/182 |
| 2,682,569 | 6/1954 | Duncan | 136/178 |
| 2,886,624 | 5/1959 | Krukowski | 136/177 |

*Primary Examiner*—Donald L. Walton
*Attorneys*—Alfred Snyder, Jr., Robert H. Robinson, Raymond L. Balfour and Anthony J. Rossi ABSTRACT: A moveable member is confined between a seat inside a battery and a hole in the battery cover. The seat may be: integrally constructed with the container walls; attached to and depending from either the walls of the container or the underside of the battery cover; sealed between the cover and container; or otherwise locked in place by the cover and container. The moveable member may be designed to function along with the cover as a nonspill vent by sealing off the hole in the cover when the battery is tilted beyond a preselected angle or to function as an indicating device to indicate when the height or the specific gravity of the electrolyte departs from a preselected point.

PATENTED DEC 28 1971

BATTERY HAVING INTERNAL SEAT FOR CONFINING A MOVEABLE MEMBER

BACKGROUND OF THE INVENTION

1. Field of the Invention

The moveable member, the seat, and the hole in the cover may cooperate to function as a nonspill vent in which the hole in the cover is sealed off by the moveable member when the battery is tilted beyond a preselected angle. The moveable member may also function as an indicating device to indicate when the height or the specific gravity of the electrolyte departs from a preselected point.

2. Description of the Prior Art

U.S. Pat. No. 2,682,569 illustrates a battery having a nonspill vent plug. While effective, that vent plug is relatively expensive. The vent plug is an external appendage which increases the battery's height and which is susceptible to damage. The vent plug must be removed to check the electrolyte level and specific gravity.

Devices which indicate the height or the specific gravity of the electrolyte have also been relatively expensive objects suspended from the vent opening in the battery cover.

SUMMARY OF THE INVENTION

A moveable member is confined between a seat inside a battery and a vent well in the battery cover. The seat may be: integrally constructed with the container walls; attached to and depending from either the walls of the container or the underside of the battery container; sealed between the cover and container; or otherwise be locked in place by the cover and the container.

By constructing the moveable member from a material whose specific gravity is greater than that of the electrolyte, the moveable member will slide and seal off the vent well when the battery is tilted beyond a preselected angle. Thus the moveable member may function to prevent spilling of the battery electrolyte when the battery is tilted successively.

By constructing the moveable member from a material whose specific gravity is always less than that of the electrolyte, the moveable member will float and act as an electrolyte level indicator.

If the moveable member has a specific gravity less than that of the electrolyte only when the electrolyte is of excessive concentration, the appearance of the moveable member above a certain height in the vent well could signal a requirement for more water or other diluting liquid of lower specific gravity.

BRIEF DESCRIPTION OF THE DRAWINGS

Fig. 2 shows a moveable member above and confined within the seat.

DESCRIPTION OF THE PREFERRED EMBODIMENTS

Figure 1:
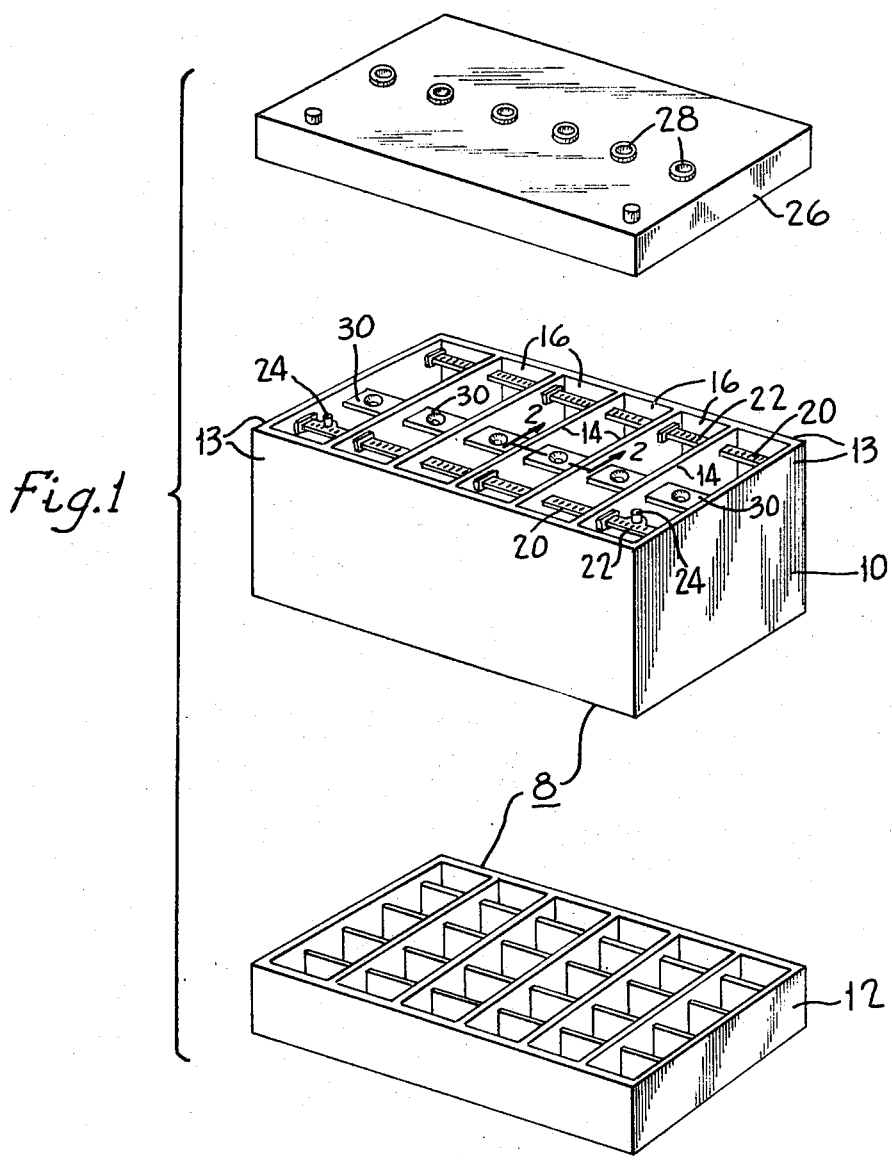
FIG. 1 shows a battery with the container in two portions. Seats for supporting and confining the moveable member of concern to this invention are shown integrally constructed with and extending between two walls of the container.

FIG. 1 illustrates a battery in which the seats for the moveable member of this invention are integrally constructed with the container walls. Since these seats will prevent the battery electrodes being passed into the container from the top, access to the interior of the container must be obtained from some other direction. The container 8 in FIG. 1 is constructed in two portions, an upper portion 10 and a lower portion 12, and the electrodes may be inserted into the cell compartments of the container through the bottom of the upper portion 10 after which the two portions 10 and 12 are sealed together. The container shown in FIG. 1 is more fully described in the application of Frederick J. Port, Ser. No. 726,068, filed May 2, 1968 now U.S. Pat. No. 3,519,489. Another container having two side portions and permitting access by the electrodes into the cell compartments through the side of the container, while not illustrated in the present drawings, is shown and fully described in the application of George J. Brennan, Ser. No. 726,069, filed May 2, 1968, now U.S. Pat. No. 3,514,342. The Brennan container also permits the seat for the moveable member to be integrally constructed with the container walls. Since the battery containers described in the Port and Brennan patents are constructed in two portions for other reasons, the integral construction of the seat of this invention will not introduce the two-portion container requirement and may be achieved without additional construction steps by simply cutting the container molds appropriately. The seats and moveable members may therefore be obtained at a much lower cost than their functional equivalents obtained by different constructions.

The container 8 has both exterior peripheral walls 13 and interior partition walls 14 which define cell compartments 16. Positive and negative electrodes (not shown in the drawings) are placed in each cell compartment. The positive electrodes in one cell compartment are mechanically and electrically connected together by positive strap connectors 20 while the negative electrodes in that same cell compartment are similarly connected together by negative strap connectors 22. In multicell batteries such as the one shown in FIG. 1 the positive strap connector in one cell compartment is electrically connected, to the negative strap connector in an adjacent cell compartment by any convenient means; the two strap connectors 20 and 22 may initially be separate pieces which are subsequently electrically connected together at some point in the battery assembly process, or they may be the two ends of a single-piece intercell strap connector which extends through the partition either in a slot in the partition or as an insert around which the partition is molded. FIG. 1 shows terminal means 24 which will extend to the exterior of the covered container, one of the terminals being electrically connected to the positive strap connector 20 for the purpose of conducting electrical current between the positive electrodes and the exterior of the covered container. The terminals may be of any desired configuration and may be constructed in any desired manner, including being extensions of the strap connectors in the two end cell compartments around which extensions the exterior walls of the container are molded. Also shown in FIG. 1 is a cover 26 for the container, the cover having a hole 28 for each cell compartment which hole may be of any desired size and configuration. Whereas conventionally such holes are known as vent wells because they vent gases as well as permit the addition of electrolyte or water, the term "hole" is used herein since, as will be shown later, the opening 28 need not always function as a gas vent.

Figure 2:
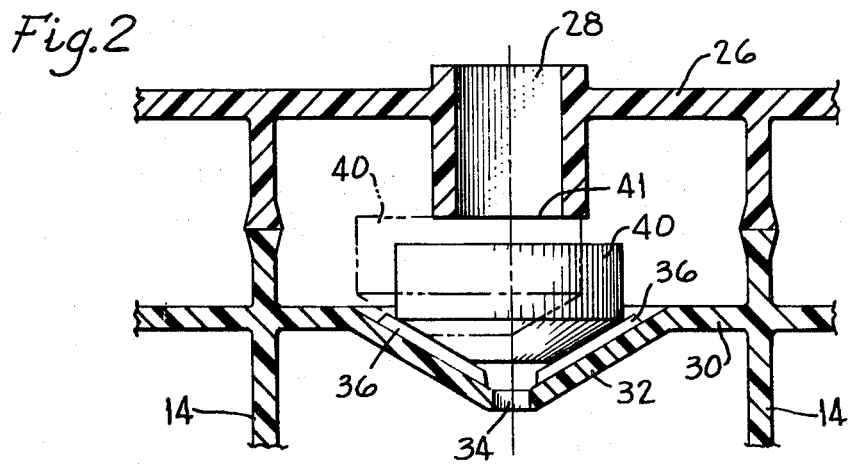
FIG. 2 is a cross section taken along the line 2—2 of FIG. 1.

FIG. 2 is a cross section of the assembled battery shown in FIG. 1. Shown in FIG. 2 is a seat 30 attached to and extending between two partition walls 14 and integrally constructed with those walls. The seat 30 could also extend between an exterior wall 13 and a partition wall 14, or in single-cell batteries would extend between the inner surfaces of two opposing exterior walls. The seat 30 is situated above the electrodes (not shown) and is also situated below the hole 28 in the cover. The seat 30 has a downwardly recessed cuplike portion 32 which may be conical in configuration. The cup 32 may have one or more holes 34 and one or more small, upwardly projecting ribs or fins 36 for the purpose of allowing electrolyte drainage, features which appear in FIG. 2 and subsequent figures. Also shown in FIG. 2 is a moveable member 40 situated above and supported by the cup 32 of the seat 30. The moveable member 40 must be beneath the hole 28 in the cover 26, although not necessarily on the same center as the hole 28. The moveable member 40 shown in FIG. 2 might have a cylindrical upper portion and a conical lower portion having a taper matching that of the cup 32. The ribs 36 may hold the moveable member 40 apart from the remainder of the cup 32, thereby permitting electrolyte flow between the moveable member and the cup. As an alternative not shown in the drawings, the ribs 36 could be constructed as part of the moveable member rather than as part of the seat.

The moveable member 40 has a size and configuration which, together with the size, configurations, and position of both the hole 28 and the seat 30, cause the moveable member to be confined between the seat and the hole.

FIG. 2 illustrates a construction in which the moveable member 40 might be constructed from a material having a specific gravity considerably greater than that of the battery electrolyte. in that instance, when the battery is tilted beyond a certain angle the moveable member will slide within the cup and come to rest against the bottom 41 of the hole (at the position shown by phantom lines in FIG. 2) sealing off the hole and providing a spillproof feature in the battery. This assembly is similar in purpose, but different in construction, to the vent plugs shown in U.S. Pat. No. 2,682,569. It will be appreciated that the angle through which the battery must be tilted before the moveable member will seal off the hole 28 will be determined by such factors as the angle of taper on both the cup 32 and the bottom of the moveable member; the extent to which the moveable member tends to stick rather than slide in the cup 32 of the seat, which in turn is dependent upon such factors as the effectiveness of ribs 36 and hole 34 in permitting electrolyte circulation, the angle of taper on both the cup and bottom of the moveable member, the viscosity of the electrolyte, the specific gravity of the moveable member relative to that of the electrolyte, etc.; and the vertical dimensioning of the seat, moveable member, and hole 28 relative to each other. Given these variables there is considerable leeway in which a designer may fashion batteries having a variety of antispill characteristics.

Figure 3:
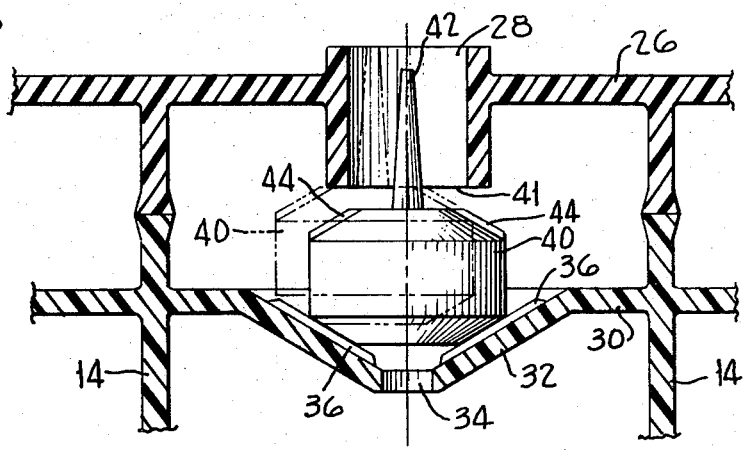
FIG. 3 is a cross section differing from that shown in FIG. 2 by the configuration and function of the moveable member.

FIG. 3 illustrates a different assembly. Using the same container, seat design, and cover as are shown in FIG. 2 but by using a different moveable member, a battery having a device for automatically indicating some characteristic of the electrolyte may be obtained. The moveable member would be designed to float, at least some of the time. If the moveable member is constructed from a material having a specific gravity less than that ever attained by the electrolyte, the moveable member will always act as a float and can be used as an indicating device for showing whether the electrolyte level inside the battery is at the proper height or not. For instance, the moveable member might have an upwardly projecting stem 42 the top of which would be at the top of the hole 28 only when the electrolyte level in the battery was at least as high as its desired level. The phantom lines in FIG. 3 show such a position. The moveable member might have a tapered upper portion around the perimeter of which were several upstanding small ribs 44. These ribs 44 would allow gases to be vented out through the hole in the usual manner, subject as usual to the electrolyte level being not higher than the bottom of the vent well. The ribs 44 would preclude the moveable member from functioning as a liquid seal, and consequently the ribs would permit additional electrolyte to spill if the battery is tilted beyond a certain angle. If the ribs 44 were not present the floating moveable member would also seal off the bottom of the vent well and thereby prevent overfilling of the battery, but in that case an additional hole functioning as a gas vent (not shown in FIG. 3) would be desirable in the cover. Again it will be apparent that there are a number of variables which combine to allow a designer freedom to design moveable members having a variety of flotation and indicating characteristics.

The construction shown in FIG. 3 may alternatively be designed to be an indicator of electrolyte specific gravity. By using a moveable member having a combination of carefully selected specific gravity and a predetermined portion of the member which can never be submerged, the designer could construct a battery in which the moveable member would sink whenever the specific gravity of the electrolyte reached or exceeded some preselected point, but would rise or float whenever the electrolyte specific gravity fell below that point.

Figure 4:
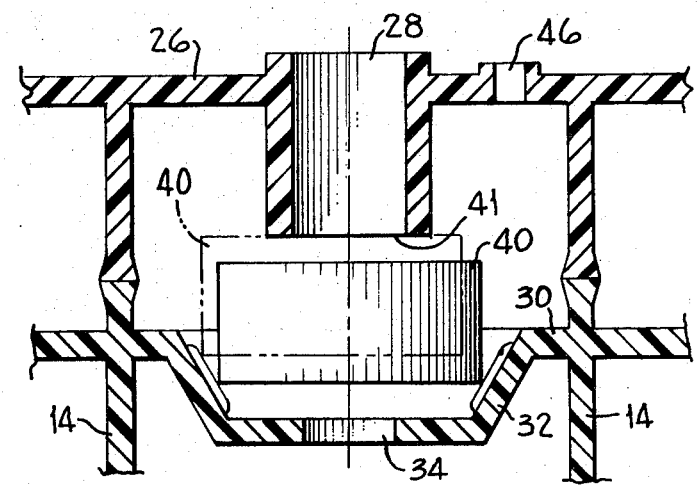
FIG. 4 is a cross section differing from that shown in FIG. 2 by the configurations of the moveable member and its seat. A small vent hole not present in FIG. 2 appears in the battery cover in FIG. 4.

FIG. 4 is shown to illustrate a different configuration in both the moveable member 40 and the cup 32 of the seat 30. If the moveable member 40 has a specific gravity always less than that of the electrolyte, the moveable member will function as a float which will seal off the bottom 31 of the hole 28 whenever the electrolyte level reaches a certain height. In that event a separate vent hole 46 might be desirable in the cover, such as is shown in FIG. 4. In FIG. 4 the floatable moving member is shown in solid lines at a low level of electrolyte position and by phantom lines at a high level of electrolyte position.

Figure 5:
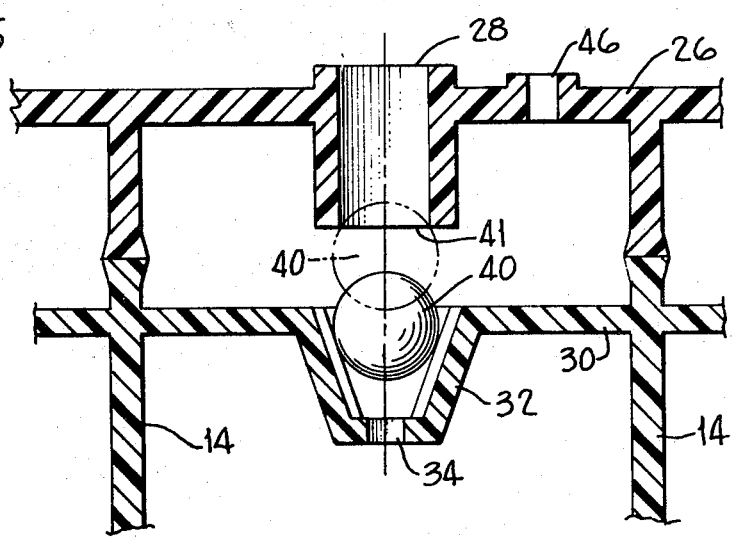
FIG. 5 is a variation of FIG. 4.

FIG. 5 is but a variation of the construction shown in FIG. 4, showing a spherical moveable member and a different configuration in the cup. As with the construction shown in FIG. 4, the moveable member could be a floating level indicator.

Figure 6:
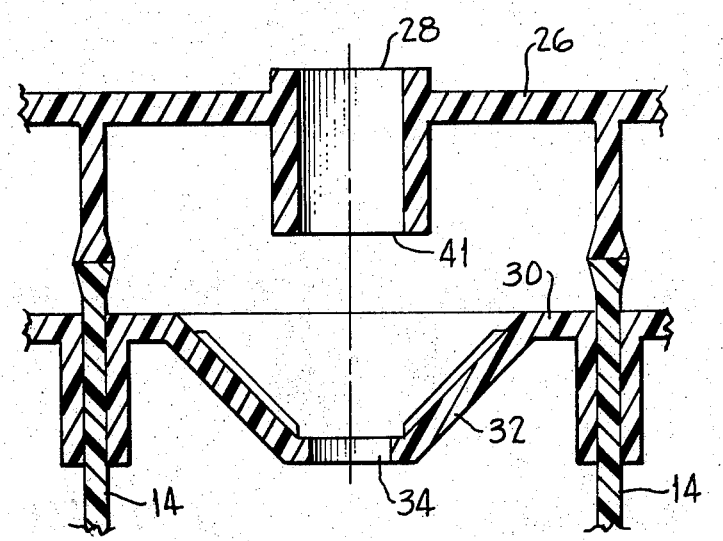
FIG. 6 is a cross section which shows the seat extending between, but not being integrally constructed with, two walls of the container.

FIG. 6 illustrates a battery in which the seat 30 is attached to and extends between two of the container walls but is not integrally constructed with those walls. Such a seat could be added after electrodes had been inserted into a conventional one-piece battery container through its open top, or it could be added to the upper portion 10 of the container shown in FIG. 1 or to a portion of the container shown in the Brennan patent. Such a seat could also be used as an optional feature, one which could be added to a container if desired or omitted from the container where not desired, thus increasing the number of different battery constructions which could be built without increasing the number of relatively expensive containers which must be molded and maintained in inventory to achieve that product flexibility. The seat could be attached to the container walls in a variety of ways, some dependent upon the materials from which the container and seat are made; sealing techniques including resins, heat, and others might be used. Alternatively, a simple friction fit might be used to attach the seat, with restraining devices molded into the container walls and/or the seat being employed to maintain the seat in the desired location after it is slid or snapped into place.

Figure 7:
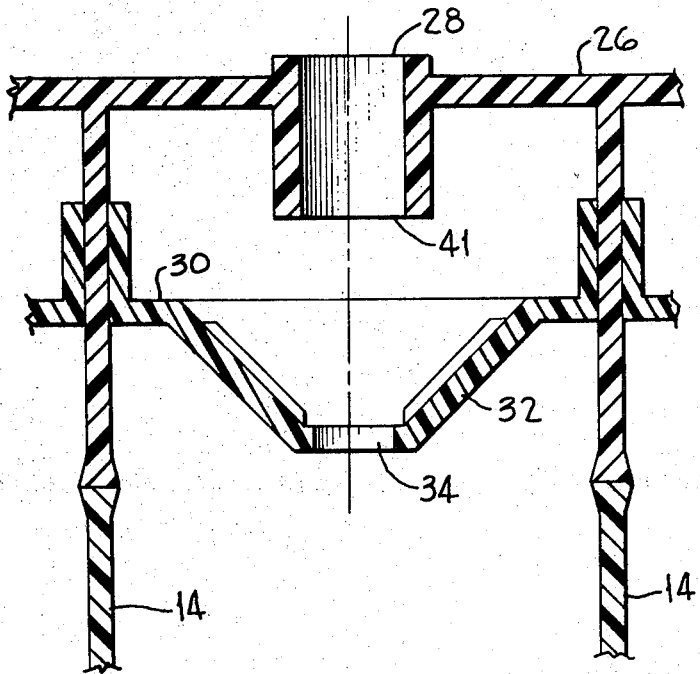
FIG. 7 is a cross section which shows the seat attached to and depending from the underside of the cover.

FIG. 7 shows the seat 30 being attached to and depending from the underside of the cover. The comments of the preceding paragraph are applicable to the construction shown in FIG. 7 also.

Figure 8:
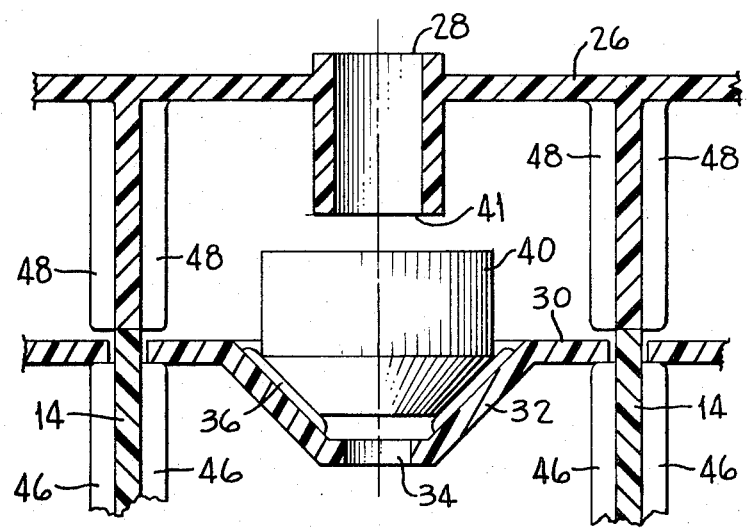
FIG. 8 is a cross section showing the seat locked in place between the cover and container, but not sealed to either the cover or container.

FIG. 8 differs from FIG. 2 by having the seat locked in place between the cover and container rather than being integrally constructed with the container walls. During the battery assembly the seat 30 is dropped into the top of the container where it is supported by a pair of ribs 46 projecting perpendicularly out from the walls 14, and then the moveable member 40 is added. When the cover 26 is subsequently added, a pair of ribs 48 projecting outward from the cover act to lock the seat between the cover and the container, although the seat may be allowed to move a slight amount both vertically and horizontally within the covered container without impairing its essential function. Like the construction shown in FIG. 2, the moveable member 40 could have a specific gravity greater than that of the electrolyte and function to prevent the electrolyte from spilling when the battery is tilted excessively.

Figure 9:
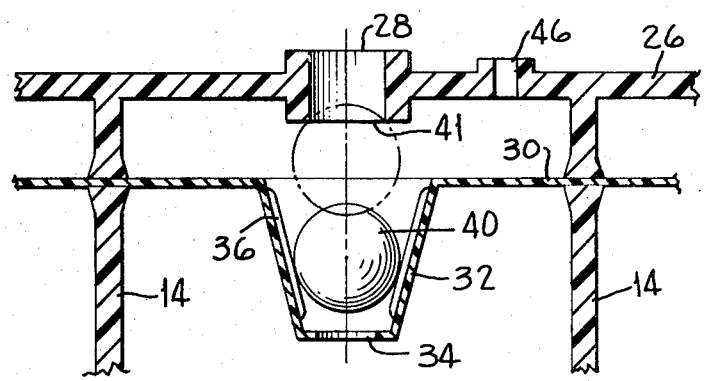
FIG. 9 is a cross section showing the seat sealed between the cover and container.

FIG. 9 illustrates still another method of securing the seat, this time by sealing the seat 30 between the cover and the container. FIG. 9 also illustrates that the bottom 41 of the hole 28 may be considerably higher than is shown in the other figures.

FIG. 9 might illustrate a construction in which the moveable member 40 always has a specific gravity less than that of the electrolyte and will thus always float. The moveable member 40 is shown in a high level of electrolyte position by solid lines and in a high level of electrolyte position by phantom lines. When in its uppermost position the moveable member 40 could seal off the bottom of the hole, making it desirable to have an additional hole 46 in the cover for the purpose of venting gases. The cup 32 of the seat 30 is constructed deep enough so that even when the electrolyte level is high enough to cause the moveable member 40 to rise and seal off the bottom 41 of the hole 28, the moveable member 28 may be submerged by a hydrometer or other instrument if a battery attendant wishes to take a sample of the battery electrolyte. Note that the seat 30 shown in FIG. 9 is very thin, a characteristic which might be desirable where the seat was being heat sealed between the cover and container or where the moveable member was a lightweight float. Moveable members having specific gravities greater than that of the electrolyte may also be used with the constructions shown in FIG. 9, except that the hole 46 would probably be undesirable in that event.

Figure 10:
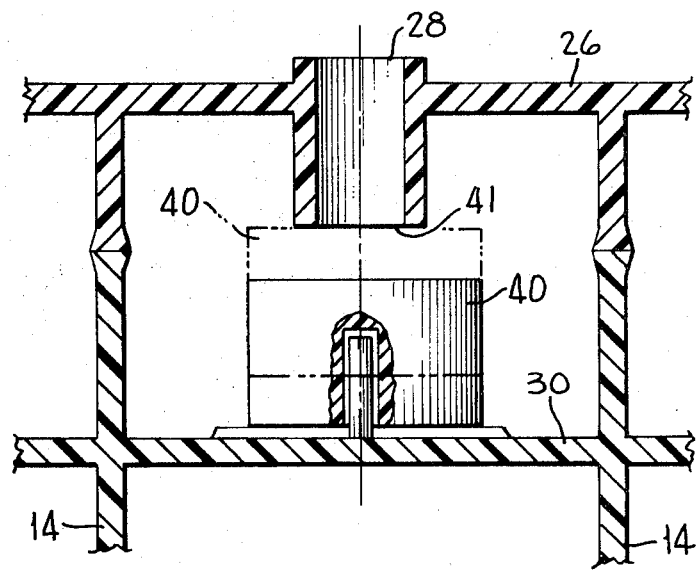
FIG. 10 is a cross section showing a moveable member and a seat of different configurations.

FIG. 10 illustrates that seats 30 not having cups 32 may be used which will confine the moveable member between the seat and the hole. Except for the configuration of the seat 30 and the moveable member 40 and the manner in which the seat confines the moveable member, the construction shown in FIG. 10 is identical with that shown in FIG. 2, but of course the seat shown in FIG. 10 may also be used with a proper modification of the moveable member shown in FIG. 3. The seat of FIG. 10 is shown as being integrally constructed with the container walls, but it could also be included by using any of the techniques shown in FIGS. 6–9. The purpose of the FIG. 10 is to illustrate the variations in configuration which the seat 30 may take from those shown in FIGS. 2 through 9.

Regardless of how the seat is secured within the battery, one consequence of the seat's presence is to reduce the tendency of the electrolyte to splash from the battery. This antisplash characteristic is of course enhanced when the moveable member is a lightweight float.

I claim:

1. A covered battery having a seat inside the container and attached to the walls thereof for confining a moveable member, the battery comprising:
   a. a container having walls and a bottom which define a cell compartment, the container having a cover with a hole therein;
   b. positive and negative electrodes in the cell compartment;
   c. means for conducting electrical current between the positive electrode and the exterior of the covered container and additional means for conducting electrical current between the negative electrode and the exterior of the covered container;
   d. electrolyte in the cell compartment;
   e. a seat attached to and extending between two of the container walls, being situated above the electrodes, and being situated below the hole in the cover, the seat being further characterized by the fact that it does not completely cover the portion of the container in which it is located and therefore does not prevent the passage of electrolyte from beneath to above the seat; and,
   f. a moveable member above the seat and between the seat and the hole, the moveable member having a size and configuration which together with the size, configurations, and position of both the hole and the seat, cause the moveable member to be horizontally and vertically confined between the seat and the hole, the moveable member also being aligned with the hole and larger in size than the hole.

2. The battery of claim 1 in which the seat is integrally constructed with the container walls.

3. The battery of claim 1 in which the moveable member has a specific gravity greater than that of the electrolyte.

4. The battery of claim 2 in which the moveable member has a specific gravity greater than that of the electrolyte.

5. A covered battery having a seat attached to the underside of the cover for confining a moveable member, the battery comprising:
   a. a container having walls and a bottom which define a cell compartment, the container having a cover with a hole therein;
   b. positive and negative electrodes in the cell compartment;
   c. means for conducting electrical current between the positive electrode and the exterior of the covered container and additional means for conducting electrical current between the negative electrode and the exterior of the covered container;
   d. electrolyte in the cell compartment;
   e. a seat attached to and depending from the underside of the cover and being situated below the hole in the cover, the seat being further characterized by the fact that it does not completely cover the portion of the container in which it is located and therefore does not prevent the passage of electrolyte from beneath to above the seat.

6. The battery of claim 5 in which the moveable member has a specific gravity less than that of the electrolyte.

7. The battery of claim 5 in which the moveable member has a specific gravity greater than that of the electrolyte.

8. A covered battery having a seat locked between the cover and container for confining a moveable member, the battery comprising:
   a. a container having walls and a bottom which define a cell compartment, the container having a cover with a hole therein;
   b. positive and negative electrodes in the cell compartment;
   c. means for conducting electrical current between the positive electrode and the exterior of the covered container and additional means for conducting electrical current between the negative electrode and the exterior of the covered container;
   d. electrolyte in the cell compartment;
   e. a seat locked between the cover and container and being situated below the hole in the cover; and,
   f. a moveable member confined between the seat and the hole.

9. The battery of claim 8 in which the moveable member has a specific gravity less than that of the electrolyte.

10. The battery of claim 8 in which the moveable member has a specific gravity greater than that of the electrolyte.

11. A covered battery having a seat sealed between the cover and container for confining a moveable member, the battery comprising:
    a. a container having walls and a bottom which define a cell compartment, the container having a cover with a hole therein;
    b. positive and negative electrodes in the cell compartment;
    c. means for conducting electrical current between the positive electrode and the exterior of the covered container and additional means for conducting electrical current between the negative electrode and the exterior of the covered container;
    d. electrolyte in the cell compartment;
    e. a seat sealed between the cover and container and being situated below the hole in the cover; and,
    f. a moveable member confined between the seat and the hole.

12. The battery of claim 11 in which the moveable member has a specific gravity less than that of the electrolyte.

13. The battery of claim 11 in which the moveable member has a specific gravity greater than that of the electrolyte.

* * * * *